United States Patent
Balannik et al.

(10) Patent No.: US 8,611,865 B1
(45) Date of Patent: Dec. 17, 2013

(54) METHODS AND APPARATUS TO MANAGE VOICE MESSAGE SYSTEM ATTRIBUTES

(75) Inventors: Vadim Balannik, Arlington Heights, IL (US); Patrick Dell Ellis, Lake In The Hills, IL (US)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/561,925

(22) Filed: Jul. 30, 2012

(51) Int. Cl.
*H04M 11/10* (2006.01)

(52) U.S. Cl.
USPC ......................................... 455/413

(58) Field of Classification Search
USPC ......................................... 455/413
See application file for complete search history.

(56) References Cited

U.S. PATENT DOCUMENTS

| | | |
|---|---|---|
| 2002/0154745 A1 | 10/2002 | Shtivelman |
| 2009/0154667 A1 | 6/2009 | Hao et al. |
| 2009/0156176 A1 | 6/2009 | Hao et al. |
| 2009/0207984 A1 | 8/2009 | Lafreniere |
| 2009/0271407 A1 | 10/2009 | Hawkins et al. |
| 2010/0167699 A1* | 7/2010 | Sigmund et al. ............. 455/413 |
| 2011/0136474 A1 | 6/2011 | Ren et al. |

* cited by examiner

*Primary Examiner* — Temica M Beamer
*Assistant Examiner* — Joel Ajayi
(74) *Attorney, Agent, or Firm* — Steven M. Greenberg, Esq.; Carey, Rodriguez, Greenberg & O'Keefe

(57) ABSTRACT

Methods and apparatus to manage voice message system attributes are described. One example method includes presenting at a mobile device a user interface of changeable attributes associated with a plurality of voicemail systems; receiving a change to one or more of the changeable attributes; receiving a designation of the voicemail systems to which the change is to be applied; and sending the change from the mobile device to the designated voicemail systems.

16 Claims, 4 Drawing Sheets

METHODS AND APPARATUS TO MANAGE VOICE MESSAGE SYSTEM ATTRIBUTES

FIELD OF THE DISCLOSURE

The present disclosure relates generally to communications and, more particularly, to methods and apparatus to manage voice messages.

BACKGROUND

Voicemail messages are typically left for a call recipient when the recipient does not answer his or her telephone. In such situations, voicemail messages are left by a caller more or less in real time with placing a call to the call recipient. Sometime later, the call recipient may contact a voicemail server to retrieve voicemail messages.

DETAILED DESCRIPTION

Figure 1:
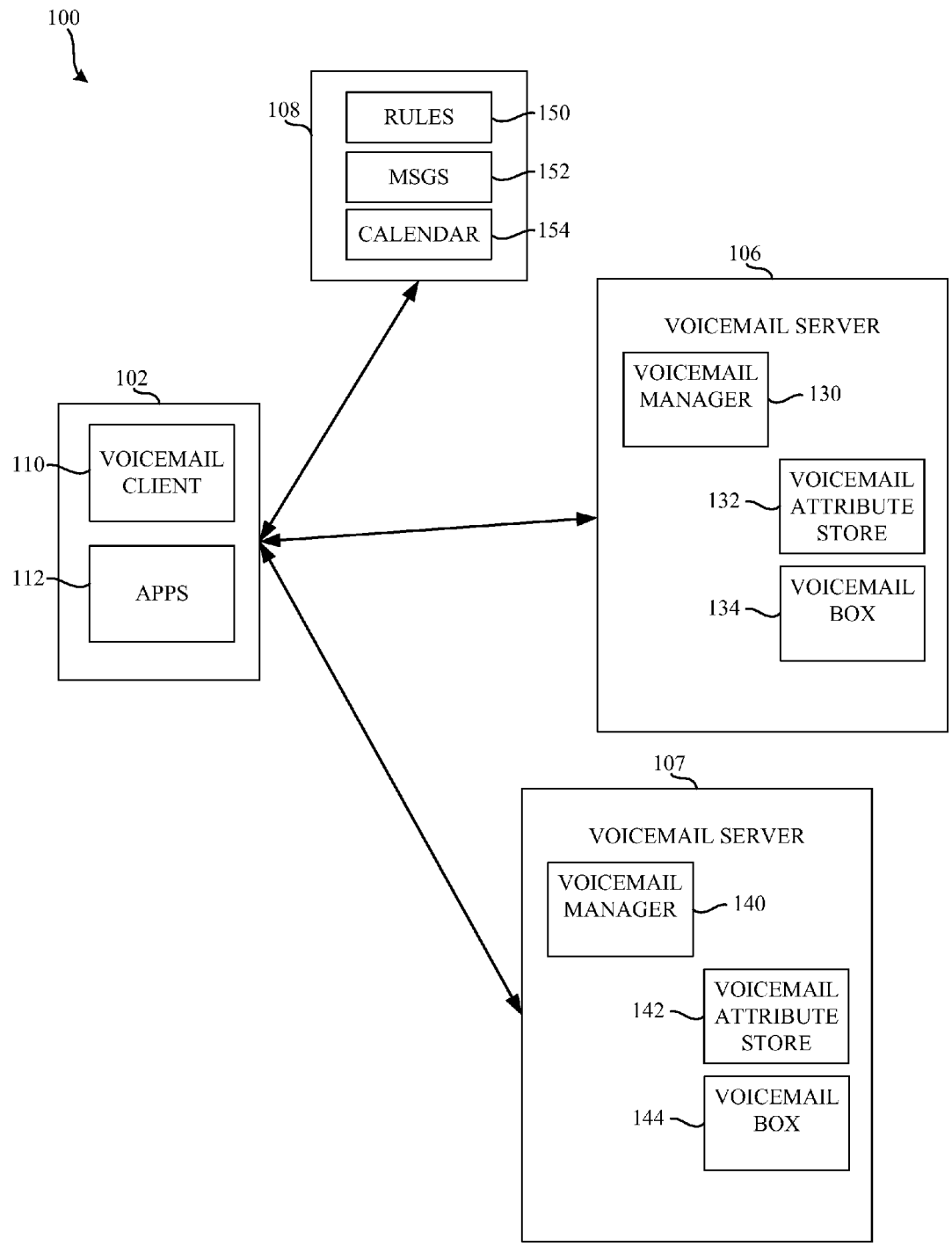
FIG. 1 depicts an example system in which a mobile device accesses servers including voicemail servers.

Although the following discloses example methods, apparatus, and articles of manufacture including, among other components, software executed on hardware, it should be noted that such methods, apparatus, and articles of manufacture are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, apparatus, and articles of manufacture, persons having ordinary skill in the art will readily appreciate that the examples provided are not the only way to implement such methods, apparatus, and articles of manufacture.

For simplicity and clarity of illustration, where considered appropriate, reference numerals may be repeated among the figures to indicate corresponding or analogous elements. In addition, numerous specific details are set forth in order to provide a thorough understanding of examples disclosed herein. However, it will be understood by those of ordinary skill in the art that examples disclosed herein may be practiced without these specific details. In other instances, well-known methods, procedures, and components have not been described in detail so as not to obscure examples disclosed herein. Also, the description is not to be considered as limiting the scope of examples disclosed herein.

Example methods, apparatus, and articles of manufacture disclosed herein may be used in connection with telephony-capable mobile devices, which may be any mobile communication device, mobile computing device, or any other element, entity, device, or service capable of communicating wirelessly. Mobile devices, also referred to as terminals, wireless terminals, mobile stations, communication stations, user equipment (UE), or user devices, may include mobile smart phones (e.g., BlackBerry® smart phones), cellular telephones, wireless personal digital assistants (PDA), tablet/laptop/notebook/netbook computers with wireless adapters, etc.

Example methods, apparatus, and articles of manufacture disclosed herein facilitate operations in a mobile device and/or an associated server. One example method includes presenting at a mobile device a user interface of changeable attributes associated with a plurality of voicemail systems, receiving a change to one or more of the changeable attributes, receiving a designation of the voicemail systems to which the change is to be applied, and sending the change from the mobile device to the designated voicemail systems.

In some examples, such a method may also include querying each of the plurality of voicemail systems to determine changeable attributes associated with each of the plurality of voicemail systems and determining changeable attributes common to each of the plurality of voicemail systems. Presenting at the mobile device the user interface may include presenting a user interface including the changeable attributes common to each of the plurality of voicemail systems. In some examples, the changeable attributes comprise one or more of a password and a greeting and receiving the designation of the voicemail systems may include receiving a designation via the user interface. The designation may include a designation of each of the plurality of voicemail systems. Sending the change from the mobile device to the designated voicemail systems may include the mobile device communicating with each of the plurality of voicemail systems.

An example mobile device described herein may include a housing, a display carried by the housing, a wireless receiver and transmitter carried by the housing, and a processor carried by the housing, coupled to the wireless receiver and transmitter, and coupled to the display. In such an example arrangement, the processor may be configured to present at a mobile device a user interface of changeable attributes associated with a plurality of voicemail systems, receive a change to one or more of the changeable attributes, receive a designation of the voicemail systems to which the change is to be applied, and send the change from the mobile device to the designated voicemail systems.

In such an example, the processor may be further configured to query each of the plurality of voicemail systems to determine changeable attributes associated with each of the plurality of voicemail systems and to determine changeable attributes common to each of the plurality of voicemail systems. Presenting at the mobile device the user interface may include presenting a user interface including the changeable attributes common to each of the plurality of voicemail systems. The changeable attributes may be one or more of a password and a greeting. Receiving the designation of the voicemail systems may include receiving a designation via the user interface. The designation may include a designation of each of the plurality of voicemail systems. Sending the change from the mobile device to the designated voicemail systems may include the mobile device communicating with each of the plurality of voicemail systems.

As shown in the example of FIG. 1, a mobile device 102 communicates with voicemail servers 106, 107 and another server 108, such as an enterprise server or an electronic mail server to receive messages therefrom and to send information thereto. The mobile device 102 may receive indications from the voicemail servers 106, 107 that the voicemail servers 106, 107 have received voicemail messages for the mobile device. The voicemail servers 106, 107 may be associated with different telephone numbers related to the user of the mobile device 102. For example, the user of the mobile device 102 may have a voicemail account associated with the cellular carrier of the mobile device 102 (e.g., AT&T, etc.) such that when a caller dials the telephone number of the mobile device 102 and the mobile device 102 does not answer the call, a voice message may be left on the voicemail server 106. Additionally, the voicemail server 107 may be associated with an office telephone number of the user of the mobile device 102, so that the voicemail server 107 receives messages associated with the mobile device 102.

Additionally, as described below, the mobile device 102 may provide information to the voicemail servers 106, 107 to set changeable attributes of the voicemail servers 106, 107 with respect to the mobile device 102. For example, the mobile device 102 may be utilized to change passwords to voicemail boxes on both of the voicemail servers 106, 107, to change greetings associated with the voicemail services, etc. Accordingly, the mobile device 102 provides a unified interface for control of the voicemail servers 106, 107 and may be used to communicate attribute changes to the voicemail servers 106, 107.

In the example of FIG. 1, the mobile device 102 includes, among other things, a voicemail client 110 and applications 112. In practice, the mobile device 102 may be implemented by a mobile telephone, a smart phone, a tablet computer, or any suitable device. The voicemail client 110 and the applications 112 may be implemented using hardware, software, firmware, coding, or any other suitable logic to facilitate the functionality described herein. Although not pictured in FIG. 1 for the sake of clarity, the mobile device 102 may include other functionality, such as wireless communication functionality, etc. The mobile device 102 is configured to communicate with the voicemail servers 106, 107 and/or the server 108, as well as suitable data networks (e.g., cellular networks, local area networks, etc.).

The voicemail client 110 may be software executed by the mobile device 102 to allow the mobile device 102 to interface with the voicemail servers 106, 107. In this manner, the mobile device 102 may convey voicemail system attribute changes to the voicemail servers 106, 107 via the voicemail client 110. In some examples, the mobile device 102 may include multiple voicemail clients to facilitate user interaction with voice messages associated with a voicemail server or voicemail servers, or such interaction may be facilitated by a single voicemail client 110. For example, the voicemail client 110 of the mobile device 102 may be associated with the voicemail server 106, which may be associated with a network carrier that provides network connectivity to mobile device 102 and may also be associated with one or more voicemail servers 107 of another entity (e.g., a voicemail server associated with an office or any other enterprise) or with any other voicemail server (e.g., a voicemail server associated with a subscription service). In such a configuration, the voicemail client 110 may be an application that is configured to support multiple voicemail servers and to facilitate user interaction with numerous voicemail servers (e.g., the voicemail servers 106, 107). Thus, the voicemail client 110 may include an account for each respective voicemail server to which the user has access. In either of these manners, the mobile device 102 may provide a user interface to visual voicemail (or any other voicemail) from numerous different sources and facilitates attribute control with each of the different sources.

The applications 112 may include smart phone applications, such as an electronic mail client, a calendar application, etc. In one example, the applications 112 may include an electronic mail client that interfaces to the server 108 via any suitable data network.

The voicemail server 106 of the example of FIG. 1 includes a voicemail manager 130, a voicemail attribute store 132, and a voicemail box 134 associated with the mobile device 102 and, in particular, the voicemail client 110 of the mobile device 102. The voicemail manager 130, in addition to carrying out standard voicemail operations, may access the voicemail attribute store 132, which includes information such as passwords, greetings, etc. associated with the mobile device 102. In this manner, the voicemail manager 130 may present to the mobile device 102 a list of attributes that may be changed and may store changes to those attributes in the voicemail attribute store 132. The voicemail box 134 is a repository for incoming and outgoing voice messages and may provide an indication of the same to the mobile device 102.

The voicemail server 107 may include similar hardware and/or software, and/or functionality as described above in connection with the voicemail server 106. The voicemail server 107 may include a voicemail manager 140, a voicemail attribute store 142, and a voicemail box 144. However, the voicemail server 107 may include changeable attributes (e.g., greetings, passwords, etc.) different than the changeable attributes of the voicemail server 106.

The server 108 may be implemented using any suitable combination of hardware and software. For example, the server 108 may be implemented as an enterprise server. In one example, the server 108 includes a rule store 150, one or more messages 152 (e.g., electronic mail messages, voice messages, etc.), and a calendar 154 including one or more events (e.g., meetings, appointments, etc.) listed therein.

In one example, the rule store 150 includes rules or criteria that the server 108 evaluates to determine if one or more voice messages are to be sent. For example, the rules store 150 may be populated using the mobile device 102.

The messages 152 may include electronic mail messages that are to be delivered to the mobile device 102 and may also include voice messages that are transferred to the server 108 from the mobile device 102.

The calendar 154 may include events, such as appointments, meetings, or any other suitable events, that are provided by the mobile device 102. In one example, the mobile device 102 may include a calendar application that includes similar information to the calendar 154 of the server 108.

In general, during operation, a user of the mobile device 102 accesses a user interface that presents one or more listings of changeable attributes of the voicemail servers 106, 107. To present this interface, the mobile device 102 may query the voicemail servers 106, 107 for lists of changeable attributes. The query may be repeated each time the user interface is to be presented, or the results of prior queries may be stored and presented during subsequent user interface presentations. The user may then interact with the user interface to change one or more of the attributes and designate the voicemail server(s) 106, 107 to which the attribute change is to be applied. The mobile device 102 then transmits the attribute changes to the designated voicemail servers or systems 106, 107 having attributes to be changed.

Additionally, during operation, the mobile device 102 aggregates voicemail from the voicemail server 106 and the voicemail server 107 at the mobile device 102. Accordingly, information from voicemail server 106 is not stored on the voicemail server 107 and vice versa. Furthermore, no intervening third-party server is used to aggregate information from the voicemail server 106 and the voicemail server 107. Aggregation of the voicemail information on the mobile device 102 facilitates a high level of security because voicemail information remains segregated at a voicemail server level.

Figure 2:
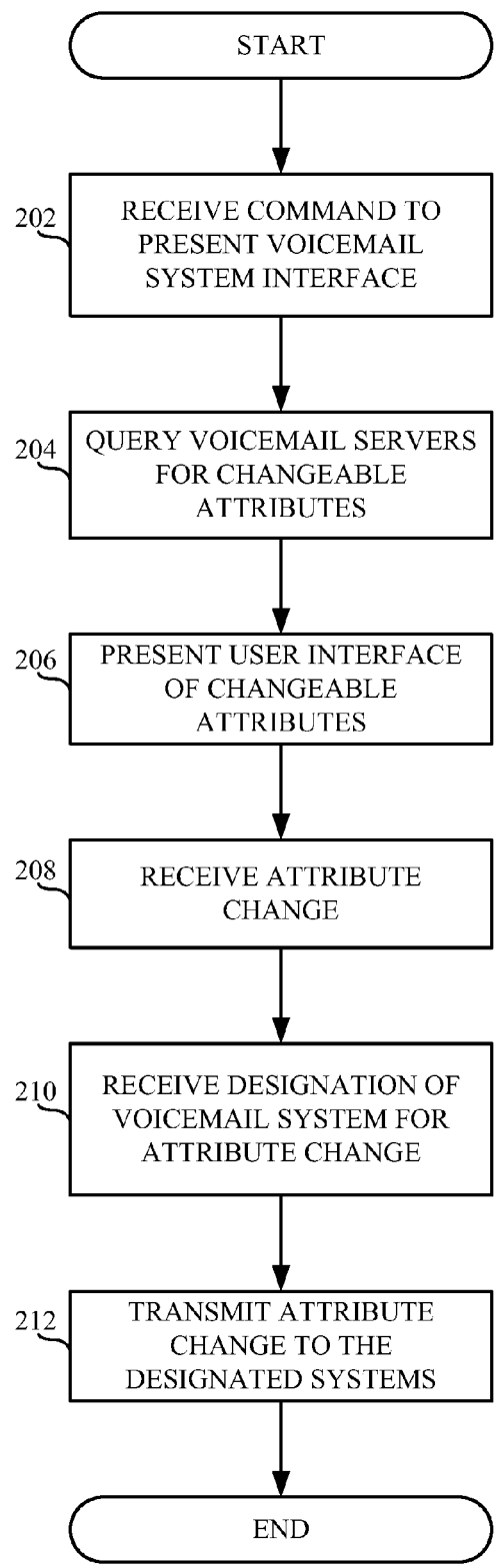
FIG. 2 is a flow diagram representative of a process, which may be implemented using computer readable instructions on a mobile device, that may be used to facilitate attribute management in accordance with the system of FIG. 1.

FIG. 2 depicts an example flow diagram representative of a process that may be implemented using, for example, computer-readable instructions stored on a computer-readable medium to send voice messages. The example process of FIG. 2 may be performed using one or more processors, controllers, and/or any other suitable processing devices. For example, the example process of FIG. 2 may be implemented using coded instructions (e.g., computer readable instructions) stored on one or more tangible computer readable media such as flash memory, read-only memory (ROM), and/or random-access memory (RAM), such as may be found in the mobile device 102 of FIG. 1.

As used herein, the term tangible computer readable medium is expressly defined to include any type of computer readable storage and to exclude propagating signals. Additionally or alternatively, the example process of FIG. 2 may be implemented using coded instructions (e.g., computer-readable instructions or machine-accessible instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information).

As used herein, the term non-transitory computer-readable medium and non-transitory machine-accessible medium are expressly defined to include any type of computer-readable medium or machine-accessible medium.

Alternatively, some or all operations of the example process of FIG. 2 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all operations of the example process of FIG. 2 may be implemented manually or as any combination(s) of any of the foregoing techniques, for example, any combination of firmware, software, discrete logic and/or hardware. Further, although the example process of FIG. 2 is described with reference to flow diagrams, other methods of implementing the process of FIG. 2 may be employed. For example, the order of execution of the blocks may be changed, and/or some of the blocks described may be changed, eliminated, sub-divided, or combined. Additionally, any or all operations of the example processes of FIG. 2 may be performed sequentially and/or in parallel by, for example, separate processing threads, processors, devices, discrete logic, circuits, etc.

In the illustrated example, the process of FIG. 2 is described below as performed by the mobile device 102 of FIG. 1. However, the example process of FIG. 2 may additionally or alternatively be implemented using any other suitable device or apparatus.

Now turning to FIG. 2, an example process to facilitate voicemail system or server attribute management is shown. The process of FIG. 2 may be implemented using, for example, computer-readable instructions or any suitable combination of hardware and/or software and may be implemented on the mobile device 102 of FIG. 1. The mobile device 102 receives a command to present a voicemail system interface (block 202). In one example, the mobile device 102 may receive the command from a user through a user interface. Alternatively, the mobile device 102 may receive the command from a server, such as one of the voicemail servers 106, 107 during configuration of the mobile device 102, during configuration of voicemail services of the mobile device 102, or at any other suitable time.

In response to the command to present the voicemail system interface (block 202), the mobile device 102 queries voicemail servers for changeable attributes (block 204). As explained above, changeable attributes may include, for example, voicemail passwords, voicemail greetings, etc. In one example, the mobile device 102 establishes communication with the voicemail servers 106, 107 to perform the queries. The queries may be carried out each time the voicemail system interfaces are presented, or the results of prior queries may be stored and reused if querying the voicemail servers 106, 107 is not desirable at any point in time.

The mobile device 102 processes the results of the queries and presents a user interface of changeable attributes (block 206). As shown in the example interfaces of FIGS. 3-6, and as described below, the user interface may include changeable attributes related to voicemail passwords, voicemail greetings, etc.

In response to the user interface of changeable attributes, the mobile device 102 receives attributes changes from the user via the user interface (block 208) and also receives designations of the voicemail systems for which the attributes are to be changed (block 210). In this way, a particular attribute may be changed and that attribute change may be designated for a plurality of voicemail servers 106, 107. Thus, it is possible to change, for example, an outgoing greeting for two different voicemail systems at one time via the described system.

In response to the attribute change (block 208) and the designation of voicemail systems for the attribute change (block 210), the mobile device 102 transmits the attribute changes to the designated systems (block 212). In one example, the mobile device 102 interfaces directly with each of the voicemail servers 106, 107 to communicate the attribute change to the designated systems.

Figure 3:
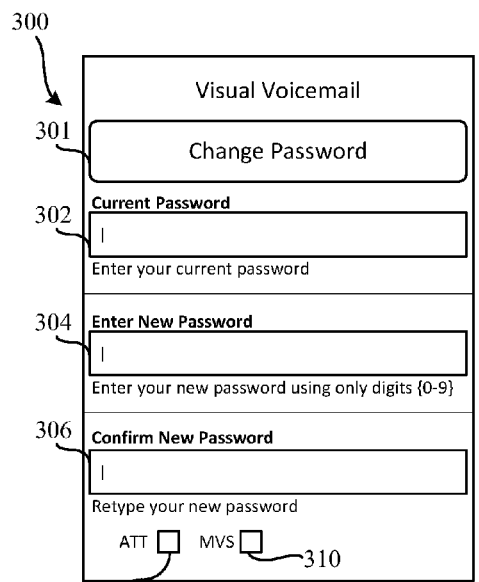
FIG. 3 depicts an example user interface that may be presented on the mobile device of FIG. 1 to facilitate attribute management, such as password management, of voicemail servers.

As shown in FIG. 3, a visual voicemail change password user interface 300 may be accessed by selecting a "Change Password" header 301. The change password user interface 300 includes a "Current Password" field 302, an "Enter New Password" field 304, and a "Confirm New Password" field 306. Additionally, as shown in FIG. 3, the change password user interface 300 includes checkboxes 308, 310 to enable the user to designate the password changes for one or more voicemail systems. For example, checkbox 308 can be used to designate a password change for the voicemail server 106 and checkbox 310 can be used designated password change for voicemail server 107. In this manner one or both of the voicemail servers 106, 107 may have the password attribute updated.

Figure 4:
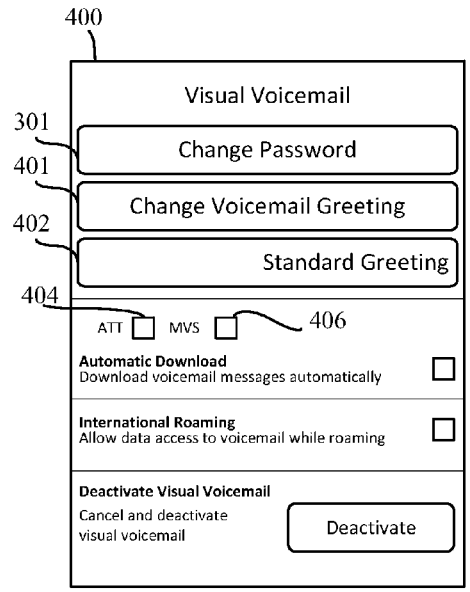
FIG. 4 depicts an example user interface that may be presented on the mobile device of FIG. 1 to facilitate attribute management, such as voicemail greeting management, of voicemail servers.

As shown in FIG. 4, a visual voicemail change voicemail greeting interface 400 may be accessed by selecting a "Change Voicemail Greeting" header 401. Selection of the "Change Voicemail Greeting" header 401 reveals a "Standard Greeting" header 402, which includes checkboxes 404, 406 to enable the user to designate usage of a standard greeting for voicemail server 106 and voicemail server 107, respectively.

Figure 5:
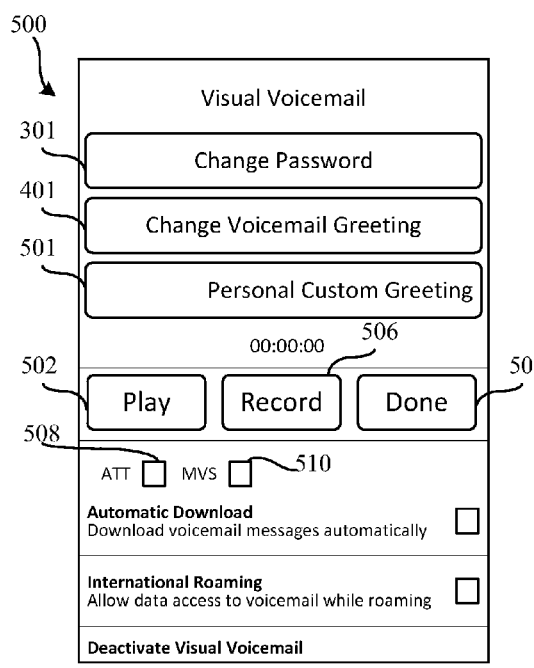
FIG. 5 depicts an example user interface that may be presented on the mobile device of FIG. 1 to facilitate attribute management, such as custom voicemail greeting management, of voicemail servers.

FIG. 5 shows a visual voicemail change voicemail greeting interface 500 that may be accessed by selecting a "Personal Custom Greeting" header 501. Selection of the "Personal Custom Greeting" header 501 reveals an interface to play 502 and record 504 custom greetings. The interface 500 also includes a "Done" icon 506 that may be selected to indicate recording of a personal custom greeting is complete. Checkboxes 508 and 510 are also included to allow the user to designate the use of the personal custom greeting in conjunction with voicemail server 106 and/or voicemail server 107.

Figure 6:
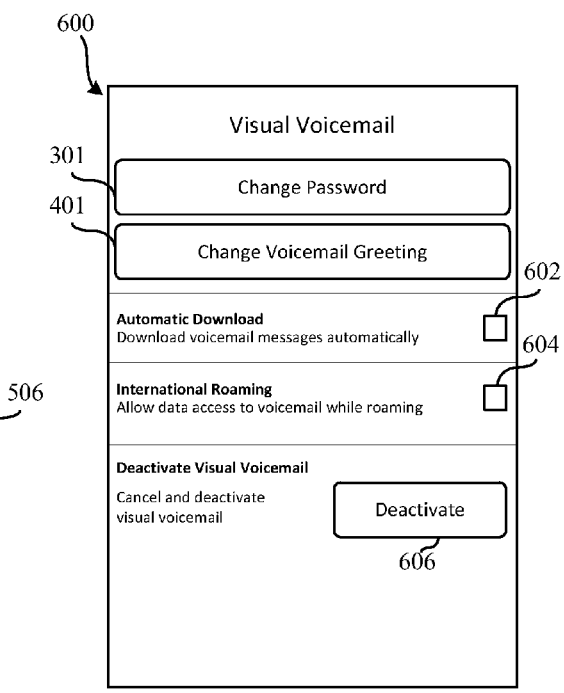
FIG. 6 depicts an example user interface that may be presented on the mobile device of FIG. 1 to facilitate attribute management, such as voicemail download management, of voicemail servers.

As shown in FIG. 6, a user interface 600 may include a first checkbox 602 to designate whether voicemail messages should be automatically downloaded and a second checkbox 604 to designate whether voicemail data should be accessed while internationally roaming. Additionally, the user interface 600 may include a deactivate icon 606 to cancel and deactivate visual voicemail.

Of course, other user interfaces may be used and other attributes may be selected and changed on a per voicemail server basis. In some examples, the user interface will include checkboxes only for voicemail servers for which a particular attribute is changeable. For example, if voicemail server 106 accommodates personal custom greetings, but voicemail server 107 does not accommodate personal custom greetings, a checkbox may be shown in association with voicemail server 106 but no checkbox may be shown in association with voicemail server 107. Alternatively, a checkbox may be shown in association with the voicemail server that does not support a particular attribute change, but the checkbox may be shown as grayed out or otherwise not accessible.

Figure 7:
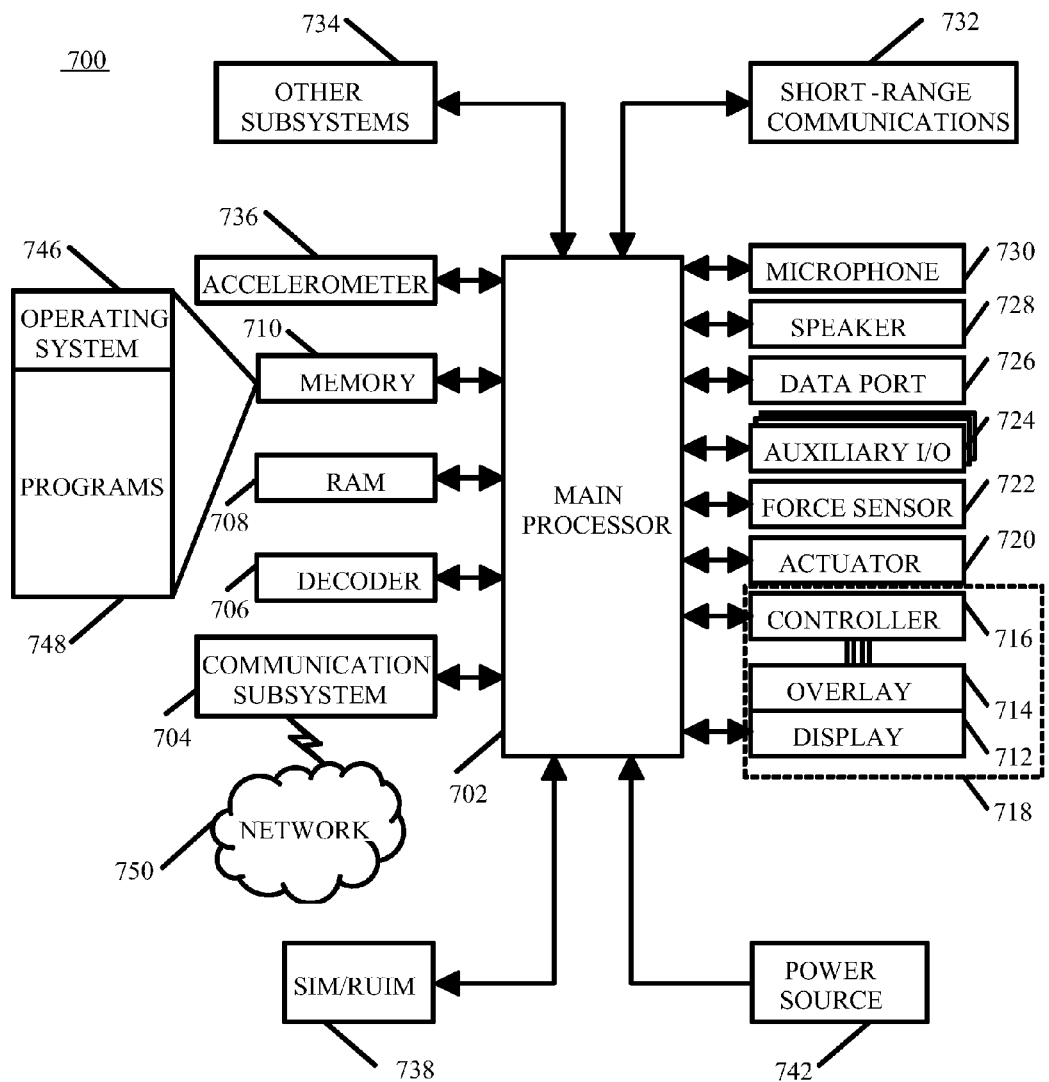
FIG. 7 is a block diagram of a mobile device in accordance with the disclosure.

Further detail of certain aspects of the mobile device 102 of FIG. 1 are shown in FIG. 7 with respect to a mobile, or portable electronic, device 700. The mobile device 700 includes multiple components, such as a processor 702 that controls the overall operation of the mobile device 700. Communication functions, including data and voice communications, are performed through a communication subsystem 704. Data received by the mobile device 700 is decompressed and decrypted by a decoder 706. The communication subsystem 704 receives messages from and sends messages to a wireless network 750. The wireless network 750 may be any type of wireless network, including, but not limited to, data wireless networks, voice wireless networks, and networks that support both voice and data communications. A power source 742, such as one or more rechargeable batteries or a port to an external power supply, powers the mobile device 700.

The processor 702 interacts with other components, such as Random Access Memory (RAM) 708, memory 710, a display 712 with a touch-sensitive overlay 714 operably coupled to an electronic controller 716 that together comprise a touch-sensitive display 718, one or more actuators 720, one or more force sensors 722, an auxiliary input/output (I/O) subsystem 724, a data port 726, a speaker 728, a microphone 730, short-range communications 732, and other device subsystems 734. In one example, the processor 702 and the memory 710 may cooperate to implement the functionality described in conjunction with the controllers 124 and 134 of FIG. 1. For example, tangible and/or non-transitory, and/or machine readable instructions may be stored by the processor 702 and/or the memory 710 to implement the functionality shown in FIGS. 2-4.

Input via a graphical user interface is provided via the touch-sensitive overlay 714. The processor 702 interacts with the touch-sensitive overlay 714 via the electronic controller 716. Information, such as text, characters, symbols, images, icons, and other items that may be displayed or rendered on a mobile device, is displayed on the touch-sensitive display 718 via the processor 702. The processor 702 may interact with an accelerometer 736 that may be utilized to detect direction of gravitational forces or gravity-induced reaction forces.

To identify a subscriber for network access, the mobile device 700 may utilize a Subscriber Identity Module or a Removable User Identity Module (SIM/RUIM) card 738 for communication with a network, such as the wireless network 750. Alternatively, user identification information may be programmed into memory 710.

The mobile device 700 includes an operating system 746 and software programs, applications, or components 748 that are executed by the processor 702 and are typically stored in a persistent, updatable store such as the memory 710. Additional applications or programs may be loaded onto the mobile device 700 through the wireless network 750, the auxiliary I/O subsystem 724, the data port 726, the short-range communications subsystem 732, or any other suitable subsystem 734.

A received signal such as a text message, an e-mail message, or web page download is processed by the communication subsystem 704 and input to the processor 702. The processor 702 processes the received signal for output to the display 712 and/or to the auxiliary I/O subsystem 724. A subscriber may generate data items, for example e-mail messages, which may be transmitted over the wireless network 750 through the communication subsystem 704. For voice communications, the overall operation of the mobile device 700 is similar. The speaker 728 outputs audible information converted from electrical signals, and the microphone 730 converts audible information into electrical signals for processing.

Example systems described herein include numerous advantages over prior approaches. For example, aggregation of voicemail from separate voicemail servers onto a mobile device without an intervening server or other entity performing such aggregation increases the overall security of the system. That is, because the voicemail residing within each voicemail system is aggregated only at the mobile device the user of which is the user of each voicemail server, each voicemail server is unaware of the contents of other voicemail servers with which the mobile device is associated. As a result, a voicemail stored on, for example, a work voicemail server remains segregated from voicemail stored on, for example, a cellular service provider voicemail server. Thus, potentially sensitive work voicemail information is not shared with the cellular service provider voicemail server.

Additionally, example systems described herein are advantageous because such systems allow for a single interface to be used to change attributes associated with multiple voicemail systems. Such a configuration enables a user to quickly and easily change voicemail attributes across a number of voicemail servers without having to individually access each voicemail server because the individual access from the mobile device to the voicemail servers is carried out by the mobile device without the need for user intervention.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method comprising:
   presenting at a mobile device a user interface of changeable attributes associated with a multiplicity of voicemail systems;
   presenting a user interface control listing the multiplicity of voicemail systems;
   receiving a change to one or more of the changeable attributes from within the user interface control and also receiving from within the user interface a designation of two or more of the multiplicity of voicemail systems to which the change is to be applied; and,
   sending the change from the mobile device to the designated two or more of the multiplicity of voicemail systems.

2. The method of claim 1, further comprising querying each of the plurality of voicemail systems to determine changeable attributes associated with each of the plurality of voicemail systems.

3. The method of claim 2, further comprising determining changeable attributes common to each of the plurality of voicemail systems.

4. The method of claim 3, wherein presenting at the mobile device the user interface comprises presenting a user interface including the changeable attributes common to each of the plurality of voicemail systems.

5. The method of claim 1, wherein the changeable attributes comprise one or more of a password and a greeting.

6. The method of claim 1, wherein receiving the designation of the voicemail systems comprises receiving a designation via the user interface.

7. The method of claim 6, wherein the designation comprises a designation of each of the plurality of voicemail systems.

8. The method of claim 1, wherein sending the change from the mobile device to the designated voicemail systems comprises the mobile device communicating with each of the plurality of voicemail systems.

9. A mobile device comprising:
   a housing;
   a display carried by the housing;
   a wireless receiver and transmitter carried by the housing;
   a processor carried by the housing, coupled to the wireless receiver and transmitter, and coupled to the display, the processor configured to present at the mobile device a user interface of changeable attributes associated with a multiplicity of voicemail systems; present a user interface control in the user interface of a listing of the multiplicity of voicemail systems; receive a change to one or more of the changeable attributes from within the user interface control and also receive from within the user interface a designation of two or more of the multiplicity of voicemail systems to which the change is to be applied; and send the change from the mobile device to the designated two or more of the multiplicity of voicemail systems.

10. The mobile device of claim 9, wherein the processor is further configured to query each of the plurality of voicemail systems to determine changeable attributes associated with each of the plurality of voicemail systems.

11. The mobile device of claim 10, wherein the processor is further configured to determine changeable attributes common to each of the plurality of voicemail systems.

12. The mobile device of claim 11, wherein presenting at the mobile device the user interface comprises presenting a user interface including the changeable attributes common to each of the plurality of voicemail systems.

13. The mobile device of claim 10, wherein the changeable attributes comprise one or more of a password and a greeting.

14. The mobile device of claim 10, wherein receiving the designation of the voicemail systems comprises receiving a designation via the user interface.

15. The mobile device of claim 14, wherein the designation comprises a designation of each of the plurality of voicemail systems.

16. The mobile device of claim 10, wherein sending the change from the mobile device to the designated voicemail systems comprises the mobile device communicating with each of the plurality of voicemail systems.

* * * * *